3,350,267
**CONTROLLING ANTIBIOTIC RESISTANT STRAINS OF *MICROCOCCUS PYOGENES* AND OTHER PATHOGENIC BACTERIA WITH NOVOBIOCIN AND OTHER ANTIBIOTICS**
Hyman Wallick, Springfield, N.J., assignor to Merck & Co., Inc., Rahway, N.J., a corporation of New Jersey
No Drawing. Filed Aug. 9, 1963, Ser. No. 300,961
1 Claim. (Cl. 167—65)

This invention relates to novel antibacterial combinations. More particularly, it is concerned with new compositions comprising synergistic combinations of novobiocin and other antibiotic substances.

This is a continuation-in-part of my pending application, Ser. No. 542,783, filed Oct. 25, 1955, now abandoned.

Novobiocin is a new bactericidal agent which is produced in accordance with methods described in my United States Patent 3,049,534, issued Aug. 14, 1962, on application Ser. No. 570,184, filed Mar. 7, 1956, as a continuation-in-part of Ser. No. 502,826 filed April 21, 1955, now abandoned. This antibiotic substance possesses a broad antibacterial spectrum and is particularly active against gram-positive microorganisms.

It is an object of this invention to provide a means for increasing the bactericidal effectiveness of novobiocin. Another object is to provide synergistic combinations of antibiotics which exert an antibacterial effect substantially greater than the activity attributable to the individual antibiotics. An additional object is to provide compositions containing combinations of novobiocin with other antibiotics. Other objects will be apparent from the detailed description of my invention hereinafter provided.

In accordance with the present invention, it is now found that novobiocin exerts a remarkable and unexpected synergistic effect when used in combination with other antibiotic substances. Combinations of this antibiotic with at least one other antibiotic such as penicillin, tetracycline, oxytetracycline, chlortetracycline, streptomycin, chloramphenicol, bacitracin, neomycin, spiramycin, streptothricin and grisein, are found to possess much greater antibacterial activity than would be expected from the individual components; thereby indicating that novobiocin potentiates the activity of the antibiotics, or that the other antibiotics potentiate the activity of novobiocin in the combinations. Accordingly, by using combinations of novobiocin and another antibiotic, it is possible to obtain a greater antibacterial effect with substantially reduced amounts of antibiotics.

The remarkable synergistic effect of combinations of novobiocin and other antibiotics is convincingly illustrated by tests using various strains of *Micrococcus pyogenes* var. *aureus* as the test organism. These tests were carried out as follows:

The test organism was cultured for eight hours in a glucose-tryptone medium. The antibiotics in various dilutions and combinations, contained in 9.5 ml. of sterile medium, were inoculated with 0.5 ml. of the eight hour culture and incubated for 16 hours at 37° C. The number of surviving bacteria was estimated by a turbidimetric technique based on the rapidity of initiation of growth in tubes of culture medium inoculated with 0.2 ml. of the surviving cells. Turbidimetric measurements, expressed in percent light transmittance were converted to numbers of bacteria which survived antibiotic treatment according to the relationships set forth by Burnell and Kirby in Antibiotic and Chemo. 1:405, 1951. The amount of antibiotics required to reduce the bacterial population, expressed in logarithms, to one-half the logarithm of the control population was recorded as the 50 percent logarithmic bactericidal concentration.

Results of these tests showing the synergistic effect of combinations of novobiocin and penicillin using a penicillin resistant strain of *M. pyogenes* var. *aureus* resistant to penicillin and a combination of novobiocin and bacitracin using *M. pyogenes* var. *aureus* are shown in Table I which follows:

TABLE I

| | 50 Percent Log Bactericidal Concentration | |
|---|---|---|
| | Novobiocin (µg./ml.) | Penicillin (u./ml.) |
| *M. pyogenes* var. *aureus* resistant to penicillin: | | |
| Penicillin alone | | 200 |
| Novobiocin alone | 2.8 | |
| Combined | 0.20 | 43 |
| | | Bacitracin (u./ml.) |
| *M. pyogenes* var. *aureus*: | | |
| Novobiocin alone | 2.7 | |
| Bacitracin alone | | 2.6 |
| Combination 1 | 1.0 | 0.032 |
| Combination 2 | 0.20 | 0.45 |

The foregoing table illustrates strikingly the dramatic synergistic effect of combinations of novobiocin and penicillin or bacitracin. Thus, as little as 22 percent of the normal bactericidal concentration of penicillin and 7 percent of the normal bactericidal concentration of novobiocin are bactericidal against the penicillin resistant strain of *M. pyogenes* var. *aureus* when employed in combination. In the case of the novobiocin-bacitracin combinations 7 and 18 percent, respectively, of the normal bactericidal concentrations were bactericidal when employed in combination.

Accordingly, the present invention provides a method for controlling antibiotic-resistant strains of pathogenic bacteria by simultaneously contacting such strains with novobiocin and at least one other of the above-mentioned antibiotics.

Similar results were also obtained with combinations of novobiocin and other antibiotics using the above-described test procedures. This data is shown in Table II below in which the concentration of the antibiotic required for bactericidal effect in combination is shown as the percent of the concentration required singly.

TABLE II

| | Percent of normal 50% inhibitory concentration required when used in combination | | Sum of both Antibiotics |
|---|---|---|---|
| | Novobiocin | Oxytetracycline | |
| Combination 1 | 25 | 23 | 48 |
| Combination 2 | 12 | 34 | 46 |
| | | Chlortetracycline | |
| Combination 1 | 37 | 10 | 47 |
| Combination 2 | 7.5 | 45 | 52.5 |
| | | Penicillin | |
| Resistant culture 657-R | 7.2 | 22 | 29.2 |
| | | Neomycin | |
| Combination 1 | 7 | 39 | 46 |
| | | Bacitracin | |
| Combination 1 | 37 | 2 | 39 |
| Combination 2 | 7.5 | 17.5 | 25 |
| | | Grisein | |
| Combination 1 | 38 | 22 | 30 |
| Combination 2 | .8 | 40 | 40.8 |
| | | Streptothricin | |
| Combination 1 | 25 | 10 | 35 |
| Combination 2 | 12 | 18.5 | 30.5 |
| | | Chloramphenicol | |
| Combination 1 | 16.5 | 16 | 32.5 |
| Combination 2 | 8.0 | 29 | 37 |
| | | Streptomycin | |
| Combination 1 | 12.5 | 2.5 | 15 |
| Combination 2 | 2.5 | 20 | 22.5 |
| Combination 3 | 7.5 | 4.2 | 11.7 |

The remarkable synergistic effect of novobiocin in combination with other antibiotics is strikingly illustrated in the foregoing table which shows that combinations of novobiocin and other antibiotics are effective in an amount as low as about 12% of the antibiotics required if they are used singly. In addition to this important advantage in reducing the concentration of antibiotics required for bactericidal effectiveness, the use of the combinations possesses the added advantage of being effective against certain resistant strains of bacteria.

The synergism was further shown by the effect of combinations of novobiocin and spiramycin in mice infected with *D. pneumoniae*. In these tests the mice were infected intraperitoneally and were treated at once. Novobiocin was given subcutaneously and spiramycin by mouth. The results of these tests are shown in Table III below.

| | Percent Survival, Spiramycin, mg./mouse | | | | | | |
|---|---|---|---|---|---|---|---|
| | 0 | 0.4 | 0.6 | 0.8 | 1.2 | 1.6 | $ED_{50}$ |
| Novobiocin: | | | | | | | |
| 0 | 0 | 0 | 0 | 5 | 30 | 70 | 1.35 |
| 1 | *0 | *0 | *20 | *40 | | | 0.79 |
| Mg./mouse: | | | | | | | |
| 2 | 5 | 30 | 70 | 90 | | | 0.52 |
| 4 | 85 | 85 | 100 | 100 | | | |
| 8 | 95 | | | | | | |
| $ED_{50}$ | 3.25 | 2.54 | 1.51 | 1.10 | | | |

*Represents 10 mice, all other points represent 20 mice.

From the above data, it will be observed that the combinations of the two antibiotics were more effective than either spiramycin or novobiocin alone. The most striking synergistic effect was shown by the combination of 0.8 mg. of spiramycin and 2.0 mg. of novobiocin which resulted in 90% survival, although the administration of the antibiotics separately each resulted in only 5% survival.

The antibiotic spiramycin discussed above is produced by growing the microorganism *Streptomyces ambofaciens* in the usual mediums used for the production of antibiotics. The microorganisms *S. ambofaciens* is identified and characterized in the publication of Pennert-Sindico in Am. Inst. Pasteur, 87, No. 6, pages 702–707 (December 1954). Methods for the production and isolation of spiramycin are described by Pennert-Sindico et al. in Antibiotics Annual 1954–1955, pages 724–727.

By the term novobiocin, as used herein, is meant both novobiocin and its salts formed by reacting novobiocin with a base.

The novel compositions of the present invention having enhanced bactericidal activity comprising novobiocin and at least one other antibiotic are especially useful in the form of pharmaceutical preparations. Thus, the combination of antibiotics can be administered in the form of tablets or capsules, for oral use, solutions or suspensions for parenteral use or oral use, powders, ointments, and salves for topical use, aerosols, and the like. These compositions can be prepared in accordance with conventional practices known in the art.

The following are examples illustrating the preparation of pharmaceutical forms of combinations of novobiocin and other antibiotics.

EXAMPLE 1

Tablets having the following composition were produced by mixing the calcium carbonate, sucrose and starch paste together, screening the mixture, drying the resulting granules and subsequently mixing the granules and remaining ingredients and tableting the mixture.

| | Gm. |
|---|---|
| Potassium penicillin G | 0.100 |
| Novobiocin | 0.100 |
| Calcium carbonate | 0.260 |
| Sucrose | 0.060 |
| Corn starch (10% paste) | 0.010 |
| Corn starch (dry) | 0.030 |
| Talc | 0.030 |
| Calcium stearate | 0.010 |
| Total | 0.600 |

EXAMPLE 2

Tablets were prepared as in Example 1 having the following composition per tablet:

| | Gm. |
|---|---|
| N-benzyl-β-phenylethylamine penicillin | 0.250 |
| Novobiocin | 0.100 |
| Calcium carbonate | 0.150 |
| Sucrose | 0.060 |
| Corn starch (10% paste) | 0.010 |
| Corn starch (dry) | 0.050 |
| Magnesium stearate | 0.040 |
| Total | 0.660 |

Such tablets are then coated with phenyl salicylate.

EXAMPLE 3

A paste-like topical ointment is prepared by first mixing thoroughly 15 g. of Aureomycin hydrochloride and 15 g. of novobiocin, each in pulverized form, with 150 g. of liquid petrolatum. A second mixture is prepared by mixing 720 g. of white petrolatum and 100 g. of anhydrous lanolin at 50° C. until a smooth uniform mixture results. The two liquid mixtures are then combined and mixed until a suspension of uniform consistency is obtained. After cooling to room temperature the viscous ointment is filled into tubes or bottles suitable for topical administration.

Similar ointments are readily prepared in which the Aureomycin component is replaced by another antibiotic such as chloromycetin, Terramycin, penicillin, bacitracin, streptothricin, or neomycin.

EXAMPLE 4

A thinner ointment is made by initially mixing 730 g. of solid white petrolatum with 20 g. of white wax at 50° C. to 245 g. of liquid petrolatum is added 4 g. of pulverized novobiocin and 8 g. of pulverized Terramycin hydrochloride. This mixture is then added to the wax base. The resulting mixture is passed through a colloid mill and packaged in suitable containers.

By replacing the Terramycin ingredient with antibiotics such as penicillin, streptothricin, chloromycetin, Aureomycin, neomycin, and bacitracin, other ointments containing potentiating combinations of antibiotics may be formulated.

EXAMPLE 5

Powder for topical application to flesh wounds, surgical incisions and abrasions are prepared by adding combinations of novobiocin with an antibiotic such as penicillin, Terramycin, etc. to a suitable pharmaceutical carrier such as talc and corn starch. Such powders are then packaged in water-tight containers until used.

EXAMPLE 6

An enteric capsule containing the ingredients:

| | G. |
|---|---|
| Novobiocin disodium salt | .125 |
| Aureomycin hydrochloride | .110 |
| Corn starch | .045 |
| Magnesium carbonate | .020 |
| Total | .300 | is prepared by first combining the corn starch and magnesium carbonate followed by the addition of the antibiotics in increments. After a uniform dispersion is obtained the resulting mixture is used to fill hard gelatin capsules.

EXAMPLE 7

*Capsules of novobiocin-spiramycin*

| | G. |
|---|---|
| Novobiocin | 10.0 |
| Spiramycin | 10.0 |
| | 20.0 |

A dry mixture of the above amounts of the two antibiotics is prepared by grinding together until thoroughly mixed. The resulting mixture is filled into gelatin capsules so that each capsule contains 500 mg. of the antibiotic combination.

Dosage forms of novobiocin and other antibiotics such as those described in the foregoing examples are safe and effective in the treatment of a variety of infectious diseases. For example, such dosage forms are effective in infections caused by gram-positive cocci such as staphylococci (*Micrococcus pyogenes* var. *aureus*), streptococci, and pneumococci. The dosage of the antibiotics combinations to be administered varies depending upon the specific circumstances. With the exception of novobiocin, the average daily dose of the antibiotics are well known. In the case of spiramycin given alone a safe and effective dose has been found to be about 3 grams/day in divided doses with amounts up to 5 or 6 grams being well tolerated. It has been suggested that an effective daily dosage of the combination novobiocin and spiramycin would be 200 mg. of novobiocin and 2.0 g. of spiramycin. The average daily dosage for novobiocin alone which is safe and effective is in the order of 1 to 2 g. In synergistic combinations with the other known antibiotics these amounts can be significantly reduced, thus providing safe and effective dosage forms for the treatment of a wide variety of infectious diseases of humans.

Novobiocin is produced by submerged fermentation as follows:

A Blake bottle containing 25 ml. of sterile aqueous agar medium consisting of:

| | Percent |
|---|---|
| Yeast extract | 1 |
| Dextrose | 1 |
| $Na_2HPO_4$ | 0.12 |
| $KH_2PO_4$ | 0.075 |
| $MgSO_4 \cdot 7H_2O$ | 0.05 |
| Agar | 2 | dissolved in water was inoculated with a loopful of soil from a soil culture of *Streptomyces spheroides* MA 319 (NRRL 2449) and incubated at 26° C. for 4–5 days until well sporulated.

Twenty ml. of sterile water was then added to the Blake bottle and the spores scraped into suspension. About 5 ml. of the resulting spore suspension was added to a 2 liter baffled Erlenmeyer flask containing 750 ml. of a sterile aqueous medium consisting of:

| | Percent |
|---|---|
| Beef extract | 0.3 |
| Casein hydrolysate (NZ amine) | 1.0 |
| Dextrose | 1 |
| Sodium chloride | 0.5 | and having a pH of about 7.2. The flask was then stoppered with cotton and incubated at 26° C. on a rotary shaker for 48 hours.

The vegetative culture so prepared was then added to a 50 gallon stainless steel fermentor containing about 25–30 gallons of a sterile beef extract medium of the composition described above. After adding a small quantity of 3% Alkaterge C (a substituted oxazoline) in mineral oil as an antifoam agent, the medium was incubated at 26° C. for 48 hours. During this incubation period the medium was agitated and sterile air was passed through the medium at the rate of about 3 c.f.m.

A 200 gallon stainless steel fermentor was then charged with about 100 gallons of an aqueous medium containing the following ingredients:

| | Percent |
|---|---|
| Soybean meal (Staley's Special Nutrient Soybean Meal 4-s) | 3 |
| Dextrose | 2 |
| Distiller's solubles | 0.75 |
| Sodium chloride | 0.25 |

This medium had a pH of about 7.1. After sterilizing the medium with steam at about 120° C. for thirty minutes and cooling, the fermentor was inoculated with about 8.4% of the vegetative inoculum prepared in the 50 gallon fermentor as described above. The batch was then incubated at 26° C. with agitation and aeration at the rate of 12 c.f.m. After 96 hours the fermented broth containing the antibiotic novobiocin had an activity of about 410 units per ml.

The antibiotic can be recovered from the fermentation broth as follows:

After filtering the whole broth at pH 9.0, 5 lbs. of diatomaceous earth filter aid (Hyflo Supercel) per 100 gal. of filtered broth was added. The broth was slowly acidified to pH 2.0 with hydrochloric acid. After 10 minutes agitation the batch was filtered and the cake washed with water. No antibiotic can be detected in the acid filtrate. The solids precipitated, exclusive of the filter aid, were ca. 0.2–0.3% pure.

The filter cake from acid precipitation was extracted twice with 85% aqueous methanol at pH 9.0 using approximately one-tenth the original broth volume for each extraction. Overall recovery through this extraction was approximately 80% of the total bioactivity present in the broth. The solids in solution were 1–1.5% pure.

The aqueous methanol solution was concentrated to a water solution, ca. one-tenth the volume of the original methanol solution. The pH was adjusted to 9.0 with caustic soda and the solution was extracted twice with equal volumes of n-butanol. The apparent distribution ratio at pH 9.0 is ca. 40:1. The solids in the butanol extract were 4–6% pure.

The butanol extract was concentrated to one-tenth the original volume and added to 15 volumes of water at pH 9.0. Filter aid (Hyflo Supercel) was added (ca. 0.5 gm./gal. based on original broth volume) and the pH was slowly adjusted to 2.0 by the addition of hydrochloric acid. All of the bioactivity is precipitated on the filter aid and is filtered off. Solids purity, exclusive of the filter aid, was ca. 10–12%.

The cake was dried in vacuo at 40° C., milled and triturated with petroleum ether until the filtrate was colorless. This eliminates 20–25% of the solids present and removes inactive oily fermentation products which remained through previous processing. No bioactivity was lost by this trituration and the solids remaining were found to be 12–15% pure.

The cake was extracted with anhydrous ethanol until the ethanol extracts were very light yellow in color. These extracts were combined and concentrated to a solution of 15–20% solids with a bioassay of ca. 200,000 u./cc. This solid material was 20–30% pure with a bioassay of 1,000–1,500 u./mg.

The concentrated ethanol solution was chromatographed on acid-washed alumina. An alumina ratio of 50:1, based on total solids present in the feed solution, must be used in order to obtain a satisfactory purification. The active material passes on through the column while a large amount of the extraneous solid material present remains on the column. The alumina column was washed with ethanol to recover the novobiocin. Approximately 95% of the bioactivity was in 2.5–3 column void volumes.

TABLE 1

| | Volume (cc.) | Bioassay (u./cc.) | Mg./cc. | U./mg. | Total Units |
|---|---|---|---|---|---|
| Col. Feed | 1,000 | 220,000 | 265 | 830 | 220×10⁵ |
| Cut I* | 1,000 | 460 | 2.5 | 183 | 0.46×10⁵ |
| Cut II | 1,000 | 42,000 | 19.6 | 2,140 | 42×10⁵ |
| Cut III | 1,000 | 76,000 | 31.3 | 2,420 | 76×10⁵ |
| Cut IV | 1,000 | 62,000 | 22.3 | 2,780 | 62×10⁵ |
| Cut V | 1,000 | 37,000 | 13.4 | 2,760 | 37×10⁶ |
| Cut VI | 1,000 | 13,000 | 4.5 | 3,020 | 13×10⁵ |
| Cut VII | 1,000 | 4,500 | 1.3 | 3,450 | 4.5×10⁵ |
| Average | 7,000 | 33,500 | 13.2 | 2,520 | |

*(1st color).
Volume of alumina = 8,000 cc.
Column void vol. = 2,600 cc.

The ethanol washes from the alumina column were concentrated to ca. 5% solids. Water was added to turbidity slightly more than an equal volume being used, and the antibiotic allowed to crystallize. The crystallization took place very slowly. After five days there still remained in the supernatant liquors up to 15% of the original bioactivity. Agitation and/or temperature variation appear to have little effect upon the rate of crystallization. This crystalline novobiocin has a bioassay of about 2,500–3,000 u./mg.

This crystalline material was dissolved in anhydrous acetone to give a 30% solution. This solution was treated with an amount of activated charcoal (Darco G–60) equal to twice the weight of the crystalline material dissolved. The Darco was filtered off and washed repeatedly with acetone to dilute the solution to a concentration of about 5% solids. Petroleum ether was added to turbidity and the novobiocin allowed to crystallize. 90–95% of the bioactivity was recovered and the crystalline novobiocin obtained assayed 4,500–5,000 u./mg.

Novobiocin is an acidic substance which forms salts upon reaction with bases. Thus, upon reacting novobiocin with one equivalent of sodium hydroxide the monosodium salt of novobiocin is obtained. Reaction with two equivalents of sodium hydroxide yields the disodium salt of novobiocin. Similarly, upon reacting novobiocin with other inorganic bases, the corresponding metal salts can be obtained. When novobiocin is reacted with an organic base such as an amine, the corresponding amine salts are obtained. Thus, upon reacting novobiocin with methyl amine, the methyl amine salt of novobiocin is obtained.

Various changes and modifications in the procedures herein disclosed will occur to those skilled in the art, and to the extent that such changes and modifications are embraced by the appended claims, it is to be understood that they constitute part of my invention.

What is claimed is:

A method for controlling antibiotic resistant strains of *Micrococcus pyogenes* and other pathogenic bacteria which comprises simultaneously contacting said bacteria with novobiocin and at least one other antibiotic selected from the group consisting of penicillin, tetracycline, oxytetracycline, chlortetracycline, streptomycin, chloramphenicol, bacitracin, neomycin, spiramycin, streptothricin and grisein.

References Cited

UNITED STATES PATENTS

| | | | |
|---|---|---|---|
| 2,895,952 | 7/1959 | Kaczka | 260—210 |
| 3,049,534 | 8/1962 | Wallick | 260—210 |
| 3,175,944 | 3/1965 | Hoeksema | 167—65 |

OTHER REFERENCES

Dowling, Antibiotics Annual, 1953–1954:27–34, December 1953.

Kolmer, "Synergistic or Additive Activity of Chemotherapeutic Compounds," Am. J. Med. Sci., February 1948, pp. 136–148.

Mann, Antibiotics & Chemo Therapy 1(4): 242–244, July 1951.

Molomut et al., Antibiotics & Chemo Therapy 3(3): 249–253, March 1953.

Rantz et al., Antibiotics & Chemo Therapy 2(12): 645–652, December 1952.

Reid et al., Antibiotics & Chemo Therapy 2(7): 351–356, July 1952.

Rhoads et al., Antibiotics & Chemo Therapy 3(7): 721–730, July 1953.

Spicer, "Bacteriologic Studies of the Newer Antibiotics: Effect of Combined Drugs on Microorganisms," J. Lab. and Clin. Med. 36(2): pp. 183–191, August 1950.

Waisbren et al., "Comparative Action of A, C, N, Q-19, and Polymixin B" (17801), Proc. Soc. Exp. Biol. Med., May 1950, pp. 35–40.

Waksman, "Antibiotics of Actinomycetes," Conference on Antibiotic Research, Washington, D.C., Jan. 31 and Feb. 1, 1947, 9 pp.

LEWIS GOTTS, *Primary Examiner.*

S. K. ROSE, *Assistant Examiner.*